(12) United States Patent
Sasaki et al.

(10) Patent No.: US 7,880,800 B2
(45) Date of Patent: Feb. 1, 2011

(54) AUTO FOCUS SYSTEM THAT CONTROLS FOCUSING SPEEDS AND MOVEMENTS BASED ON IMAGE CONDITIONS

(75) Inventors: Tadashi Sasaki, Saitama (JP); Atsushi Kanayama, Saitama (JP)

(73) Assignee: FujiFilm Corporation, Tokyo (JP)

( * ) Notice: Subject to any disclaimer, the term of this patent is extended or adjusted under 35 U.S.C. 154(b) by 355 days.

(21) Appl. No.: 11/792,541

(22) PCT Filed: Sep. 26, 2005

(86) PCT No.: PCT/JP2005/017602

§ 371 (c)(1),
(2), (4) Date: Jun. 7, 2007

(87) PCT Pub. No.: WO2006/061938

PCT Pub. Date: Jun. 15, 2006

(65) Prior Publication Data
US 2008/0084497 A1  Apr. 10, 2008

(30) Foreign Application Priority Data
Dec. 8, 2004  (JP) .............................. 2004-355332

(51) Int. Cl.
*H04N 5/232* (2006.01)
*G03B 13/00* (2006.01)

(52) U.S. Cl. ..................................... 348/345

(58) Field of Classification Search ............... 348/345, 348/349; 396/79, 137
See application file for complete search history.

(56) References Cited

U.S. PATENT DOCUMENTS

| 4,556,907 | A | * | 12/1985 | Urata et al. | ............... 348/211.4 |
| 5,842,059 | A | * | 11/1998 | Suda | ........................... 348/354 |
| 5,896,174 | A | * | 4/1999 | Nakata | ....................... 348/352 |
| 6,621,521 | B1 | * | 9/2003 | Ohta | ........................... 348/345 |
| 2002/0080258 | A1 | * | 6/2002 | Ohta | ........................... 348/347 |
| 2004/0130652 | A1 | * | 7/2004 | Sasaki et al. | ................ 348/349 |

FOREIGN PATENT DOCUMENTS

| JP | 59-121968 U | 8/1984 |
| JP | 63-74273 A | 4/1988 |
| JP | 3-297282 A | 12/1991 |
| JP | 4-076524 A | 3/1992 |
| JP | 6-062301 A | 3/1994 |
| JP | 5-007324 A | 1/1998 |
| JP | 10-042184 A | 2/1998 |
| JP | 10-232343 A | 9/1998 |
| JP | 2001-119623 A | 4/2001 |
| JP | 2003-167219 A | 6/2003 |
| JP | 2004-085674 A | 3/2004 |
| JP | 2004-258085 A | 9/2004 |

* cited by examiner

*Primary Examiner*—Jason Whipkey
(74) *Attorney, Agent, or Firm*—Birch, Stewart, Kolasch & Birch, LLP

(57) ABSTRACT

An auto focus system is provided in which a focus movement speed and a cut off frequency of a filter for detecting a contrast from a video signal in AF of a contrast detecting system can be manually set in AF, so that an optimum AF can be achieved under various photographing conditions.

6 Claims, 12 Drawing Sheets

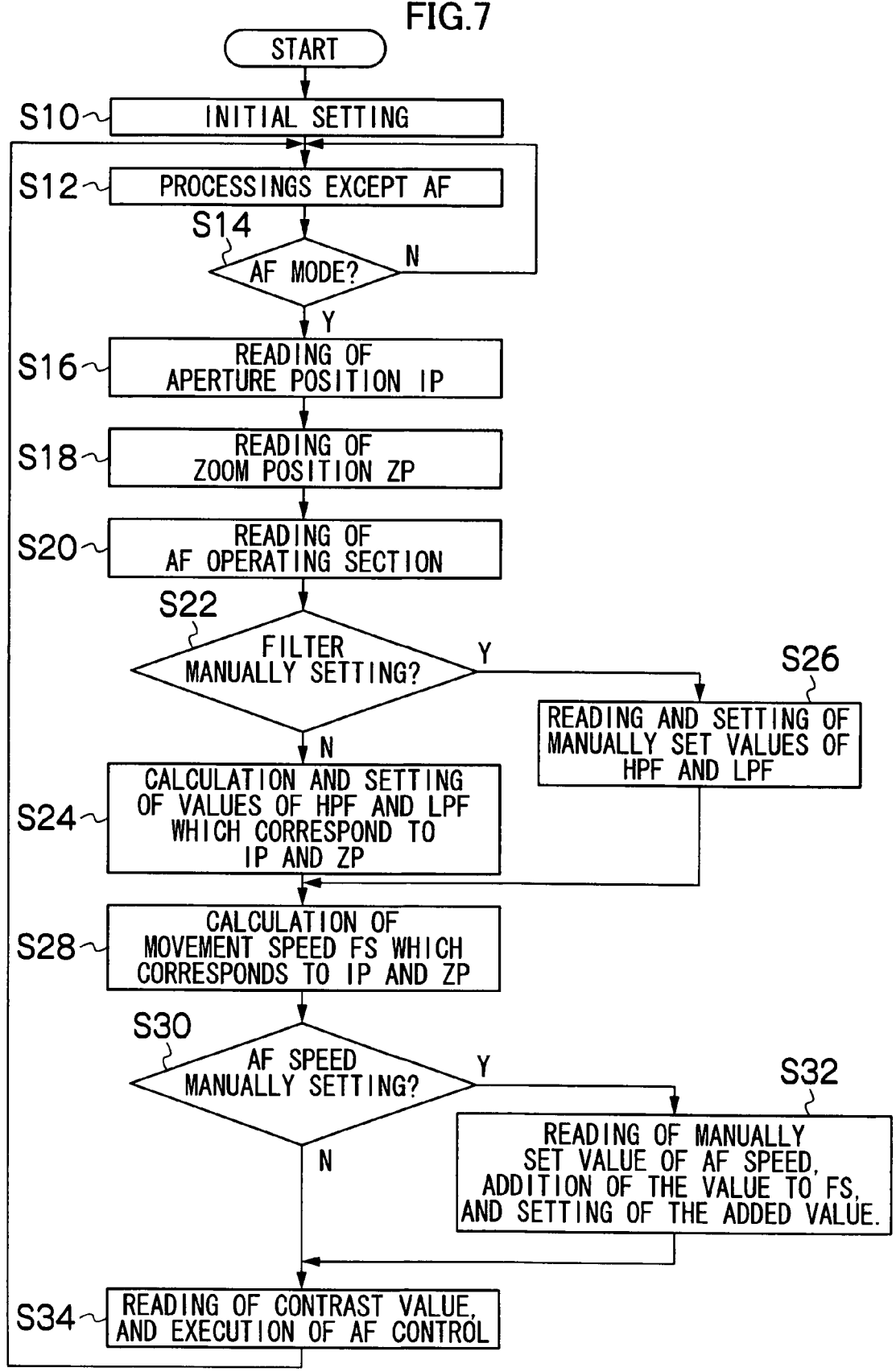

AUTO FOCUS SYSTEM THAT CONTROLS FOCUSING SPEEDS AND MOVEMENTS BASED ON IMAGE CONDITIONS

TECHNICAL FIELD

The present invention relates to an auto focus system, and in particular, to an auto focus system which automatically focuses based on a contrast of an image of an object.

BACKGROUND ART

Generally, a contrast detecting system is used as an auto focus (hereinafter, referred to as AF) system in TV cameras and video cameras. In the AF of the contrast detecting system, for example, a video signal is obtained by photographing an object, and a signal of a higher frequency component is extracted from the video signal by using a filter (electrical filter), so that a contrast degree (sharpness) of the image of the object is evaluated based on the signal of the higher frequency component. Then, a focus (focusing lens) position of a photographing lens is controlled to make the evaluated value (which is herein called "contrast value") the largest or maximum (peak).

When a relationship between a focus position and a contrast value is illustrated in a graph (contrast value graph) with the focus position being along a horizontal axis and the contrast value being along a vertical axis, in photographing a certain object, a graph curve (hereinafter, referred to as contrast value curve) exhibits a unimodal distribution which has the peak of a contrast value at a focusing position for focusing. Thus, as a method for setting a focus at the peak point, a so-called hill climbing technique is known in which a direction of an increasing contrast value is detected so as to move a focus in the direction, and the focus is stopped at a position where no increase of the contrast value is detected. For example, Japanese Patent Application Laid-Open Nos. 63-074273 and 03-297282 describe an AF in a contrast detecting system.

A steepness of a unimodal distribution of a contrast value curve changes depending on conditions of an object or an optical setting of a photographing lens. For example, for a photograph of an object with a high contrast due to many high contrast patterns or contour lines, the unimodal distribution of a contrast value curve steeply slopes, and to the contrary, for photographing of an object with a low contrast due to less patterns or contour lines, the unimodal distribution of a contrast value curve gently slopes.

In addition, the steepness of a unimodal distribution of a contrast value curve changes depending on an aperture value in the case of a photographing lens of a rear focus type, and depending on a focal length and an aperture value in the case of a zoomable photographing lens which has an adjustable focal length of a front focus type. For example, in the latter case, when a zoom adjustment is set toward the tele side (a longer focal length) and an aperture is moved toward an opening side (a smaller aperture value), the unimodal distribution of a contrast value curve steeply slopes, while when a zoom adjustment is set toward the wide side and an aperture is moved toward an closing side (a larger aperture value), the unimodal distribution of a contrast value curve gently slopes.

When a focus position (focusing lens) is moved to a peak of a contrast value by using the above described hill climbing technique in AF, generally, the more gently the unimodal distribution of a contrast value curve slopes, the higher a focusing speed is, which is the movement speed of a focus (especially, the focusing speed in AF is called AF speed), and also the larger a position error between the position where the focus is stopped for the peak of the contrast value and the true focus position is, which results in a low focusing accuracy (which is called AF accuracy).

While, the more steeply the unimodal distribution of a contrast value curve slopes, to the contrary to the above case, the higher an AF accuracy is, but a higher AF speed makes it difficult to stop the focus at the peak of a contrast value, which easily causes various phenomena such as hunting.

Conventionally, in order to prevent phenomena such as hunting and achieve a preferred AF, methods have been proposed, in which in obtaining a contrast value, a cut off frequency of a filter for extracting a signal within a predetermined frequency band from an image signal is automatically changed depending on a setting of a photographing lens or an AF speed is automatically changed depending on a setting of a photographing lens, so that a unimodal distribution of a contrast value curve does not slope too steeply relative to the AF speed, or the AF speed is not too high relative to the steepness of a unimodal distribution of a contrast value curve.

DISCLOSURE OF THE INVENTION

Problems to be Solved by this Invention

However, for example, assume a case in which a unimodal distribution of a contrast value curve steeply slopes and hunting can be caused at an expected AF speed. In this case, if the hunting is prevented by controlling a cut off frequency of a filter as described above so that the unimodal distribution of a contrast value curve gently slopes, the AF speed is not lowered (the control of the cut off frequency contributes to an increase of an AF speed) but an AF accuracy is lowered. To the contrary, if the hunting is prevented by lowering the AF speed, the AF accuracy is not lowered (the lowered AF speed contributes to an increase of an AF accuracy) but the AF speed is lowered. That is, an increase of an AF accuracy and an increase of an AF speed are mutually contradictory.

Therefore, it is desirable, under such restriction, that both of a cut off frequency of a filter and an AF speed are controlled to obtain a state in which both of the AF accuracy and the AF speed are the optimum, but because a different purpose and environment of AF requires a different ratio of effect of the AF accuracy to the AF speed, there is not a primary state determined to be the optimum. If a cut off frequency of a filter and an AF speed is automatically controlled depending on a setting of a photographing lens as in the prior art, a primary cut off frequency of the filter and a primary AF speed is determined by the setting of the photographing lens without consideration on a purpose of use of AF in individual photographing, which causes a problem that an optimum AF is not always achieved.

In addition, an actual contrast value curve is not determined only by a setting of a photographing lens, but varies depending on conditions of an object as described above. For example, generally, a longer focal length of a photographing lens causes a unimodal distribution of a contrast value curve to steeply slope, but if an object has a low contrast, a length of the focal length of a photographing lens does not influence much on the steepness of a unimodal distribution of a contrast value curve. A degree of the steepness of a unimodal distribution varies depending on a contrast of an object itself.

Therefore, problems sometimes arise when a cut off frequency of a filter and an AF speed are set so that the resulting AF accuracy and AF speed can comply with the purpose of use of AF, because if the cut off frequency and the AF speed are set only based on a setting of a photographing lens as in the prior art, depending on conditions of an object, the resulting AF accuracy may be lower than intended, the resulting AF speed may be unnecessarily low although the AF speed can be set to be higher without a deficiency of hunting, or a deficiency such as hunting may occur due to the resulting higher AF speed relative to a steepness of a unimodal distribution of a contrast value curve.

The present invention was made in view of the above situation, and one object of the present invention is to provide an auto focus system for achieve an optimum AF in the light of a setting of a photographing lens, conditions of an object, and a purpose of use of AF in individual photographing.

Means to Solve the Problems

To achieve the above object, the present invention provides an auto focus system of a first aspect for moving a focusing lens of a photographing lens based on a contrast of an image of an object which is focused by the photographing lens, comprising: auto focus controlling means for automatically setting the focusing lens to a focus position; and speed indicating means for inputting an indication of a movement speed of the focusing lens, so that the auto focus controlling means causes the focusing lens to move at the movement speed indicated by the speed indicating means.

According to the first aspect of the present invention, an movement speed (AF speed) of a focusing lens in AF can be controlled to comply with a setting of a photographing lens and conditions of an object, resulting in that deficiency such as hunting can be prevented without fail.

The present invention provides the auto focus system of a second aspect according to the first aspect, further comprising: contrast value calculating means for calculating a contrast value which represents a contrast of the image of an object by using a video signal of the image of an object focused by the photographing lens, the contrast value calculating means having filter means for extracting a signal within a predetermined frequency band from the video signal; and frequency indicating means for inputting an indication of a cut off frequency of the filter means for blocking a signal having a higher or lower frequency component of the video signal, and wherein the filter means is changed to have a feature with a cut off frequency which is indicated by the frequency indicating means.

According to the second aspect of the present invention, a cut off frequency of the filter means is changed so that a steepness of a unimodal distribution of a contrast value curve can be controlled and an AF accuracy can be controlled. Because both of a steepness and an AF accuracy are controlled, hunting can be prevented without fail, and an AF accuracy and an AF speed can be set to comply with a purpose of use of AF in accordance with a priority level in individual photographing.

The present invention provides the auto focus system of a third aspect according to the first aspect, characterized in that the auto focus controlling means comprises: an automatically setting mode for automatically setting a movement speed of the focusing lens in response to the setting of the photographing lens which at least includes a focal length or an aperture value; and a manually setting mode for setting a movement speed of the focusing lens to the movement speed indicated by the speed indicating means. The automatically setting mode for automatically setting an AF speed which enables an appropriate AF under normal conditions of an object is convenient for the case in which no manual control is required.

The present invention provides the auto focus system of a fourth aspect according to the third aspect, characterized in that the speed indicating means inputs an indication of an amount of change with respect to the movement speed of the focusing lens which is set by the automatically setting mode, and in the manually setting mode, the auto focus controlling means sets the value obtained by adding the amount of change to the movement speed which is set by the automatically setting mode as a movement speed of the focusing lens. A manual change of an AF speed on the basis of an AF speed which is set in an automatically setting mode facilitates a control of the AF speed.

The present invention provides the auto focus system of a fifth aspect according to the first or second aspect, characterized in that the speed indicating means is the means for indicating to change the movement speed of the focusing lens to a movement speed which is obtained by multiplying a standard movement speed by a predetermined factor. According to the fifth aspect, a movement speed of the focusing lens, that is, an AF speed can be instantly changed to a higher speed or a lower speed.

The present invention provides the auto focus system of a sixth aspect according to the fifth aspect, further comprising: changing means for changing the standard movement speed of the focusing lens. According to the sixth aspect, when an AF speed can be changed from a standard movement speed to a movement speed which is obtained by multiplying a standard movement speed by a predetermined factor, the standard movement speed itself can be changed to a desired speed.

The present invention provides the auto focus system of a seventh aspect according to the fifth or sixth aspect, characterized in that the speed indicating means is a switch mounted to a focus operation apparatus for performing an operation with respect to the focusing lens. The speed indicating means of the fifth or sixth aspect provides an enhanced operability when mounted to a focus operation apparatus such as a focus on demand image processing component (focus controller).

Effect of the Invention

According to an auto focus system of the present invention, AF can be achieved under optimum conditions in response to a setting of a photographing lens, conditions of an object, a purpose of use of AF, and the like in individual photographing.

BRIEF DESCRIPTION OF THE DRAWINGS

FIG. 7 is a flowchart showing a procedure for setting an AF speed and cut off frequencies of HPF and LPF;

DESCRIPTION OF SYMBOLS

Figure 1:
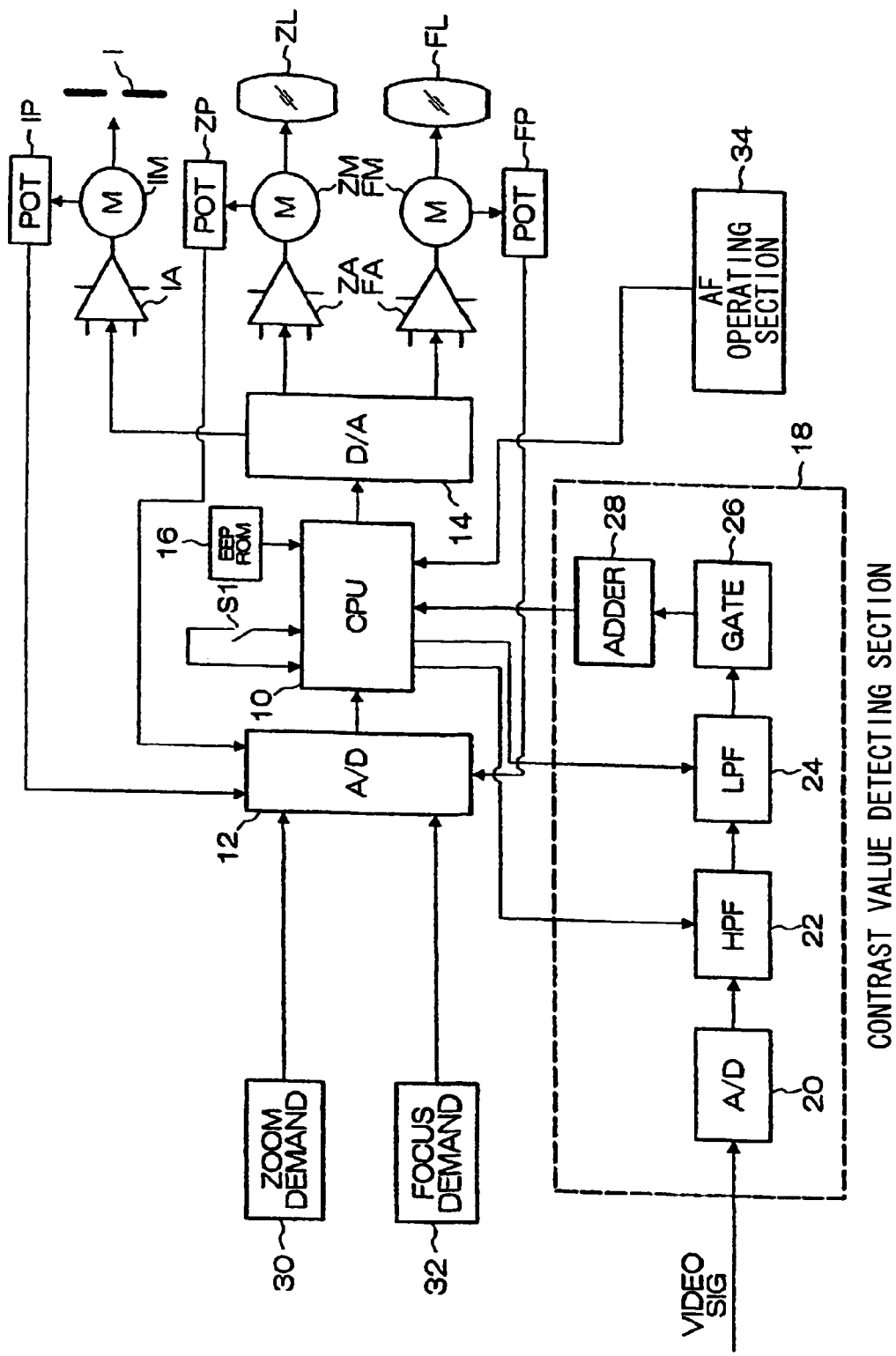
FIG. 1 is a block diagram showing a structure of a lens system to which the present invention is applied.

10 . . . CPU
12, 20 . . . A/D converter
14 . . . D/A converter
18 . . . contrast value detecting section
22 . . . high pass filter
24 . . . low pass filter
26 . . . gate circuit
28 . . . addition circuit
30 . . . zoom on demand image processing component
32 . . . focus on demand image processing component
34 . . . AF operating section
50, 56 . . . A/M switch
52, 54, 58 . . . dial
60 . . . memo pad switch
62 . . . selection switch
80 . . . AF speed selector
82 . . . AF speed control switch
ZL . . . zoom lens
FL . . . focusing lens
I . . . aperture
ZM, FM, IM . . . motor

BEST MODE FOR CARRYING OUT THE INVENTION

Now, preferred embodiments of an auto focus system according to the present invention will be explained in detail below with reference to the accompanying drawings.

FIG. 1 is a block view showing a structure of a lens system to which the present invention is applied. The lens system shown in FIG. 1 is for example a lens system which is used in TV camera for TV broadcasting, and although the detail configuration of which are not shown, includes a photographing lens (optical system) and a control system.

The photographing lens of the lens system is attached to a camera body having a replaceable lens (not shown) via a mount, and the photographing lens focuses an image of an object on a photosensitive surface of an image pickup device which is provided to the camera body. The photographing lens includes optical components such as a (group of) zoom lens ZL, a (group of) focusing lens FL, and an aperture I, and the zoom lens ZL and the focusing lens FL are movably arranged in the direction of an optical axis, and are coupled to motors ZM and FM respectively. Therefore, the driving forces of the motors ZM and FM cause the zoom lens ZL and the focusing lens FL to move to the direction of an optical axis, and the movement of the zoom lens ZL causes a change of a zoom factor (focal length) of the photographing lens, and the movement of the focusing lens FL causes a change of focus position of the photographing lens. The aperture I is coupled to a motor IM, and is opened and closed by the driving force of the motor IM to change the brightness of an image.

The control system of the lens system includes a control section having a CPU 10 mounted to a lens unit which is integral with the above photographing lens, an A/D converter 12, D/A converter 14, a contrast value detecting section 18, amplifiers ZA, FA, and IA, position sensors ZP, FP, and IP, a zoom on demand image processing component 30, a focus on demand image processing component 32, and an AF operating section (AF operation apparatus) 34 which are connected to the lens unit via a cable and the like.

The zoom (zoom lens ZL or focusing lens FL) of the photographing lens is configured to be manually operated by using a controller which is connected to the lens unit such as the zoom on demand image processing component 30 or the focus on demand image processing component 32, and when a photographer performs a zoom operation by using the zoom on demand image processing component 30, in response to the operation, a zoom command signal which represents a target value of a position of zoom (zoom lens ZL) or a movement speed is transferred from the zoom demand 12 to the CPU 10 via the A/D converter 12.

The CPU 10 controls a rotation speed of the motor ZM based on the value of the zoom command signal which is output to the amplifier ZA via the D/A converter 14, and controls the zoom lens ZL coupled to the motor ZM to have the target value which is commanded by the zoom command signal. At this point, the CPU 10 has obtained information of the current position of the zoom lens ZL which is necessary for the zoom control from the position sensor ZP via the A/D converter 12.

While the focus mode which will be explained below is a manually focusing (MF) mode, when a photographer performs a focus operation by using the focus on demand image processing component 32, in response to the operation, a focus command signal which represents a target value of a position of the focusing lens FL or a movement speed is transferred to the CPU 10 via the A/D converter 12 from the focus demand 14.

As in the case of the zoom control, the CPU 10 controls a rotation speed of the motor FM based on the value of the focus command signal which is output to the amplifier FA via the D/A converter 14, and controls the focusing lens FL coupled to the motor FM to have the target value which is commanded by the focus command signal. At this point, the CPU 10 has obtained information of the current position of the focus lens FL which is necessary for the focus control from the position sensor FP via the A/D converter 12.

Meanwhile, the aperture I of the photographing lens is configured to be controlled by an iris command signal from the camera body (not shown) to which the photographing lens is mounted for example, so that a target value of an aperture position for an appropriate brightness of an image based on the image signal obtained by the image pickup device of the camera body is output as an iris command signal from the camera body to the CPU 10 via the A/D converter 12.

The CPU 10 controls a rotation speed of the motor IM based on the value of the iris command signal which is output to the amplifier IA via the D/A converter 14, and controls the aperture I coupled to the motor IM to be located at the aperture position which is commanded as the target value by the iris command signal. At this point, the CPU 10 has obtained information of the current position of the aperture I which is necessary for the zoom control from the position sensor IP via the A/D converter 12.

The lens system has a built-in auto focus system, so that a switching from the above described manual focus (MF) mode to the auto focus (AF) mode by an AF switch S1 which is mounted to a controller connected to a housing of the lens unit or the lens unit causes the CPU 10 to execute an AF control for an automatic focus of the photographing lens. In the system, a contrast detection type AF is used in which a contrast of an image of an object is detected and a focus is controlled to have the maximum contrast, so that a focused condition is obtained. Also, a so-called one shot AF is used in which a switching from the MF mode to the AF mode by a turning on of the automatic return type AF switch S1 causes an AF control to be executed so that a focused state is obtained, and once the focused state is obtained, the AF control is stopped and the AF mode is returned to the MF mode.

As described above, the CPU 10 in the MF mode controls the motor FM based on the focus command signal which is issued in response to a manual operation by using the focus on demand image processing component 32, and controls the focusing lens FL to be in the state (position or movement speed) which is commanded by the focus command signal. A turning on of the AF switch S1 in the MF mode causes the CPU 10 to detect the operation and change the mode to the AF mode so as to execute the AF control as described below.

The camera body generates a video signal in a predetermined format (for example, NTSC format in the present embodiment) after a photoelectric conversion of an image of an object focused by the photographing lens by using an image pickup device and processings of the image at various processing circuits, and the video signal (luminance signal) is transferred to the contrast value detecting section 18 from the camera body to a lens unit. During an AF control, the contrast value detecting section 18 detects a high or low contrast of an image of an object as a contrast value based on the video signal provided by the camera body, and issues the contrast value to the CPU 10.

Figure 2A:
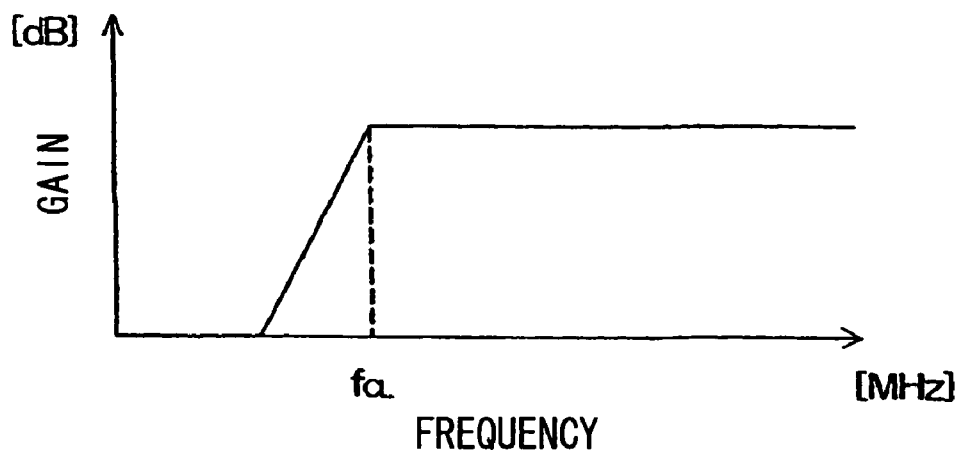
FIG. 2A is a diagram showing features of a high pass filter in a contrast value detecting section.

The contrast value detecting section 18 is configured with an A/D converter 20, a high pass filter (HPF) 22, a low pass filter (LPF) 24, a gate circuit 26, and an addition circuit 28. The video signal input to the contrast value detecting section 18 is converted from an analog signal to a digital signal by the A/D converter 20. The video signal which is converted to the digital signal is input to the HPF 22, so that a signal of a lower frequency component than a predetermined cut off frequency $f_{CL}$ is blocked and a signal of a higher frequency component than the cut off frequency $f_{CL}$ is extracted by the HPF 22 which has a filter feature as shown in FIG. 2A.

Figure 2B:
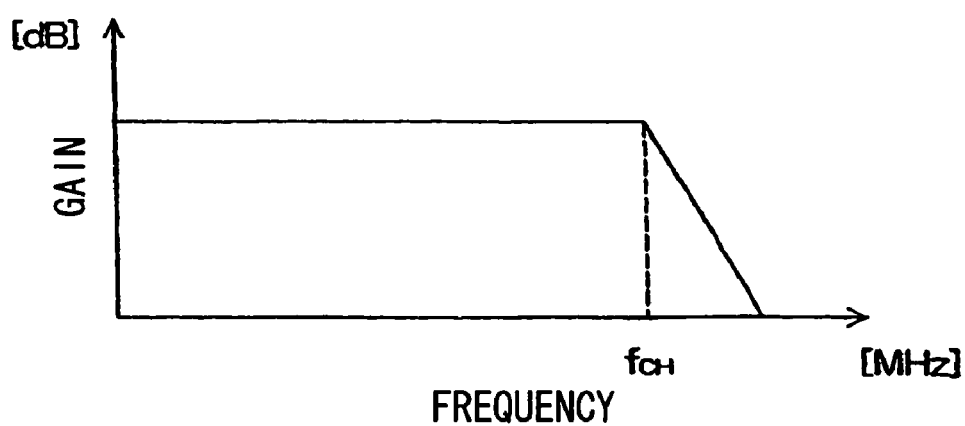
FIG. 2B is a diagram showing features of a low pass filter in a contrast value detecting section.

Then, the video signal extracted by the HPF 22 is input to the LPF 24 as shown in FIG. 2B, so that a signal of a higher frequency component than a predetermined cut off frequency $f_{CH}$ is blocked and a signal of a lower frequency component than the cut off frequency $f_{CH}$ is extracted by the LPF 24.

Figure 2C:
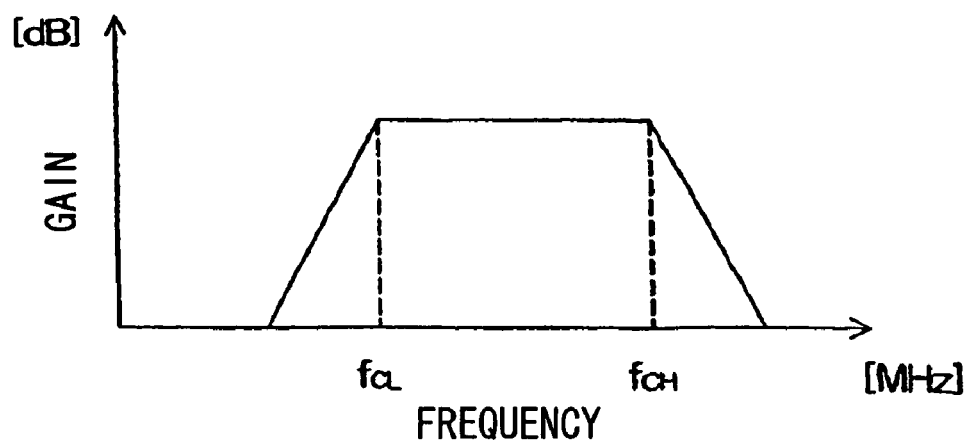
FIG. 2C is a diagram showing features of both of the filters in a contrast value detecting section.

As shown in the feature view of FIG. 2C in which the filter features of the HPF 22 and the LPF 24 are superimposed, among the video signals provided by the HPF 22 and the LPF 24 from the camera body, the video signal of a frequency component which is higher than the lower cut off frequency $f_{CL}$ and lower than the higher cut off frequency $f_{CH}$. The HPF 22 and the LPF 24 are, for example, digital filters the feature of which is changeable by an electrically given filter coefficient, and the filter features such as the cut off frequency $f_{CL}$ of the HPF 22 and the cut off frequency $f_{CH}$ of the LPF 24 can be changed by a filter coefficient which is set by the CPU 10 as described below. The HPF 22 and the LPF 24 may be configured as a single band pass filter.

The video signal of the frequency component extracted by the HPF 22 and the LPF 24 is then input to a gate circuit 26.

The gate circuit 26 extracts only the video signal within a target area of an object for AF on the screen which constitutes each field image (for example, an AF area which is a central rectangular area on the screen). The extracted video signal in the AF area is input to an addition circuit 28 and is added for each field.

The resulting addition value which is obtained for each field by the addition circuit 28 as described above represents a degree of contrast of an image of an object, and the addition value is transferred to the CPU 10 as a contrast value.

Meanwhile, the CPU 10 obtains the contrast value calculated by the contrast value detecting section 18 as described above in AF control, and also as in the MF mode, outputs the focus control signal to the amplifier FA to control the rotation speed of the motor FM. This causes the focusing lens FL to move to the position where the contrast value is the largest (maximum).

The known hill climbing technique is applied as a control method for moving a focusing lens FL to the position where the contrast value is the largest (maximum). For example, after an AF control is started, the CPU 10 displaces the focusing lens FL in a minute amount forward and backward (to the direction toward the closest and to the direction toward the infinity) based on the current set position of the focusing lens FL as the reference position, so that contrast values at the reference position and each displaced position are obtained from the contrast value detecting section 18. This enables the CPU 10 to detect a direction in which the contrast values increase relative to the reference position. When no direction in which the contrast values increase is detected, the AF control is ended with the focusing lens FL being fixed at the reference position, as the focus position, where the focusing lens FL was set at the beginning of the AF control.

To the contrary, when a direction in which the contrast values increase is detected by using the contrast values obtained in the wobbling, the CPU 10 causes the focusing lens FL to move to the direction at a predetermined speed. While moving the focusing lens FL or stopping the focusing lens FL as needed, the CPU 10 obtains new contrast values from the contrast value detecting section 18 to determine if the new contrast values are larger than the contrast values which were obtained in the previous control. The movement speed of the focusing lens FL at this point of time is called AF speed. The AF speed changes at an acceleration or deceleration and is not constant, but can be represented by a characteristic speed value such as the maximum speed value or an average speed value.

In the above described determination, if is determined that the contrast values increase, the CPU continues to cause the focusing lens FL to move in the same direction. To the contrary, if is determined that the contrast values decrease, the CPU determines that the focusing lens FL already passes the peak of the contrast value, that is, the focus position, and causes the focusing lens FL to move in the reverse direction at a lower speed. And when the amounts of difference between the contrast values which are obtained in series are small enough to be considered constant, the CPU 10 determines the position at the point of time as the focus position of the focusing lens FL, and makes the focusing lens FL stop at the position.

After setting the focus position of the focusing lens FL as described above, the CPU 10 ends the AF control and goes to the processings in MF mode.

Figure 3:
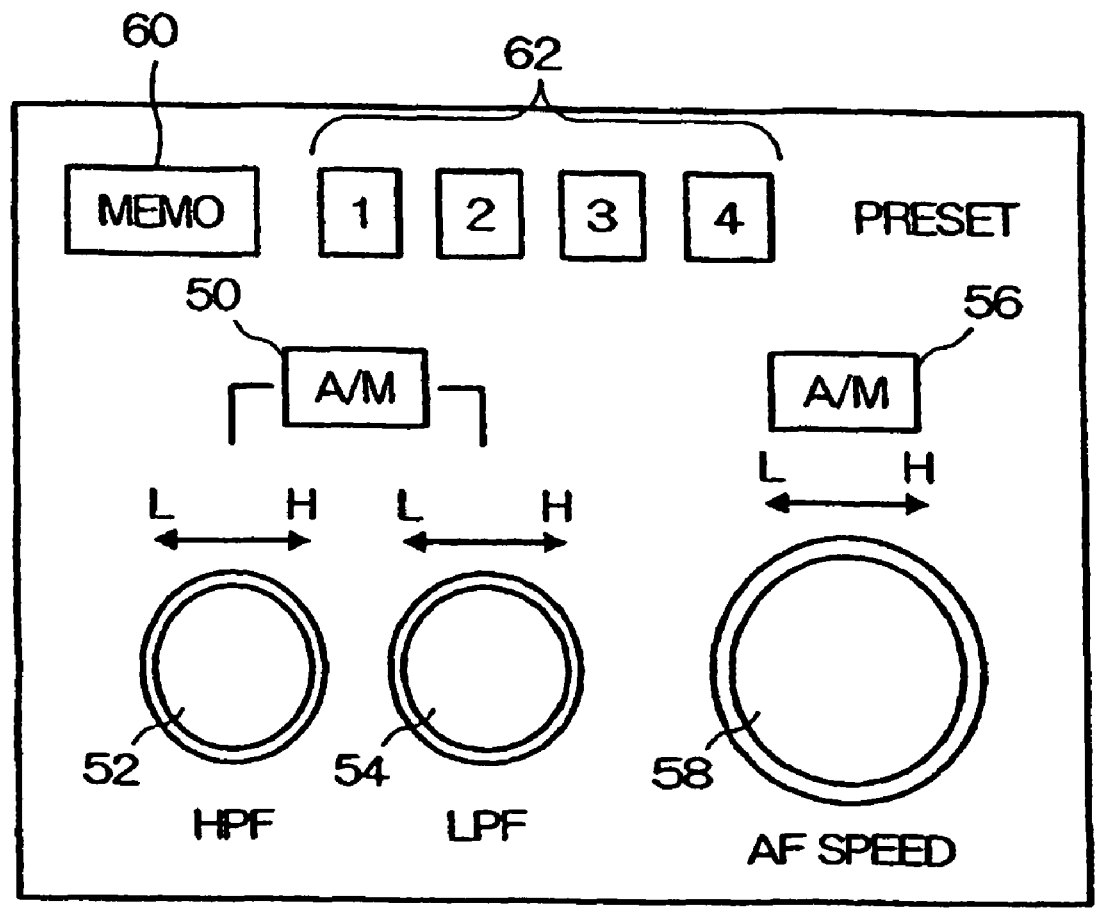
FIG. 3 is a front view showing an outside structure of an AF operating section.

Next, cut off frequencies $f_{CL}$, $f_{CH}$ of the HPF 22 and LPF 24 and a movement speed (AF speed) of the focusing lens FL at the contrast value detecting section 18 in AF control will be explained below. The AF operating section 34 is connected to the lens unit as shown in FIG. 1, so that a user can control the AF speed and the cut off frequencies $f_{CL}$, $f_{CH}$ of the HPF 22 and LPF 24 to desired values through operations of the AF operating section 34. FIG. 3 is a front view showing an outside structure of the AF operating section 34. In FIG. 3, an A/M switch 50 is a switch for selecting between a filter automatically setting mode for automatically setting the cut off frequencies $f_{CL}$, $f_{CH}$ of the HPF 22 and LPF 24, and a filter manually setting mode for manually setting the cut off frequencies $f_{CL}$, $f_{CH}$. In an off state, the filter automatically setting mode is selected and a built-in lamp is extinguished, and in an on state, the filter manually setting mode is selected and the built-in lamp is lighted.

The CPU 10 communicates with the AF operating section 34 to obtain the on/off state of the A/M switch 50 so that the CPU 10 detects a selection of the filter automatically setting mode or the filter manually setting mode. When the filter automatically setting mode is selected, the CPU 10 sets filter coefficiencies which are applied to the HPF 22 and the LPF 24 to be the values in consideration of a focal length of the photographing lens (position of the zoom lens ZL) and an aperture value (position of the aperture I), and sets the cut off frequency (lower cut off frequency) $f_{CL}$ of the HPF 22 and the cut off frequency (higher cut off frequency) $f_{CH}$ of the LPF 24 shown in FIG. 2 to be normal values (standard values) with consideration of a focal length of the photographing lens and an aperture value, which will be explained below.

When the filter manually setting mode is selected by the A/M switch 50 of the AF operating section 34, the CPU 10 changes filter coefficiencies which are applied to the HPF 22 and the LPF 24 in response to the manual operation at the AF operating section 34, and sets the cut off frequency (lower cut off frequency) $f_{CL}$ of the HPF 22 and the cut off frequency (higher cut off frequency) $f_{CH}$ of the LPF 24 to be the values specified by the manual operation. In FIG. 3, dials 52 and 54 are rotation operating members to specify the cut off frequency $f_{CL}$ of the HPF 22 and the cut off frequency $f_{CH}$ of the LPF 24 respectively, and when the filter manually setting mode is selected, the rotated position of the dials 52 and 54 are detected by a potentiometer and transferred to the CPU 10.

The CPU 10 sets the cut off frequency $f_{CL}$ of the HPF 22 to be the value (manually set value) which corresponds to the rotated position of the dial 52 by applying a filter coefficient which corresponds to the rotated position of the dial 52 to the HPF 22. Similarly, the CPU 10 sets the cut off frequency $f_{CH}$ of the LPF 24 to be the value (manually set value) which corresponds to the rotated position of the dial 54 by applying a filter coefficient which corresponds to the rotated position of the dial 54 to the LPF 24.

Figure 4:
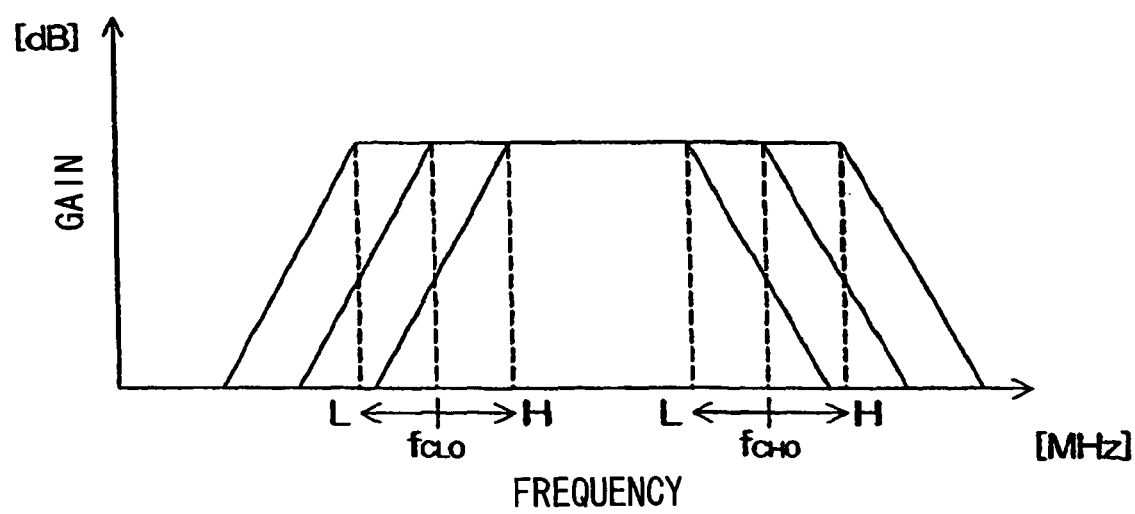
FIG. 4 is a diagram showing features of both of the HPF and LPF, and showing a change of a cut off frequency in a filter manually setting mode.

The above configuration changes the cut off frequencies of the HPF 22 and the LPF 24 as follows. FIG. 4 is a view showing filter features of both of the HPF 22 and LPF 24. As shown in FIG. 4, the lower cut off frequency $f_{CL}$ which is the cut off frequency of the HPF 22 is set to be a value $f_{CL0}$ when the dial 52 is at the middle position of its rotation range. A clockwise rotation of the dial 52 from the middle position causes the lower cut off frequency $f_{CL}$ to be shifted to a higher value from the value $f_{CL0}$. A counterclockwise rotation of the dial 52 from the middle position causes the lower cut off frequency $f_{CL}$ to be shifted to a lower value from the value $f_{CL0}$. Similarly, the higher cut off frequency $f_{CH}$ which is the cut off frequency of the LPF 24 is set to be a value $f_{CH0}$ when the dial 54 is at the middle position of its rotation range. A clockwise rotation of the dial 54 from the middle position causes the higher cut off frequency $f_{CH}$ to be shifted to a higher value from the value $f_{CH0}$. A counterclockwise rotation of the dial 54 from the middle position causes the higher cut off frequency $f_{CH}$ to be shifted to a lower value from the value $f_{CH0}$.

When the dials 52 and 54 are at the middle position of the rotation ranges, the cut off frequencies $f_{CH0}$ and $f_{CL0}$ are predetermined certain values in the present embodiment, but may be the cut off frequencies (standard values) of the HPF 22 and the LPF 24 which are changed in response to the setting of the photographing lens in the filter automatically setting mode.

As described above, since the cut off frequencies of the HPF 22 and the LPF 24 can be changed in the filter manually setting mode, the steepness of a unimodal distribution of a contrast value curve can be set to be the optimum in the light of a setting of the photographing lens, conditions of an object, and a purpose of use of AF in individual photographing.

Figure 5A:
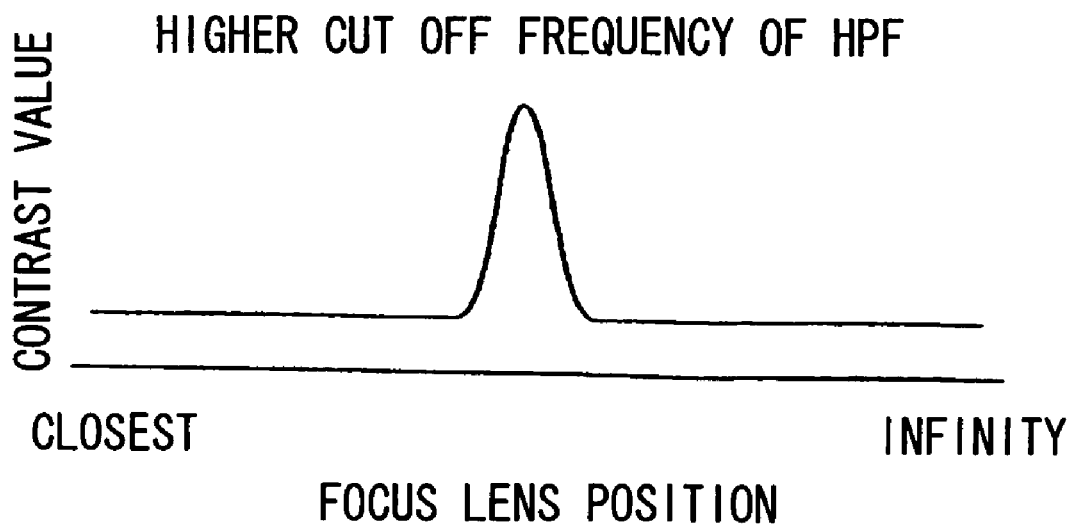
FIG. 5A is a diagram showing a general effect on a contrast value curve when a cut off frequency is increased in an HPF.
Figure 5B:
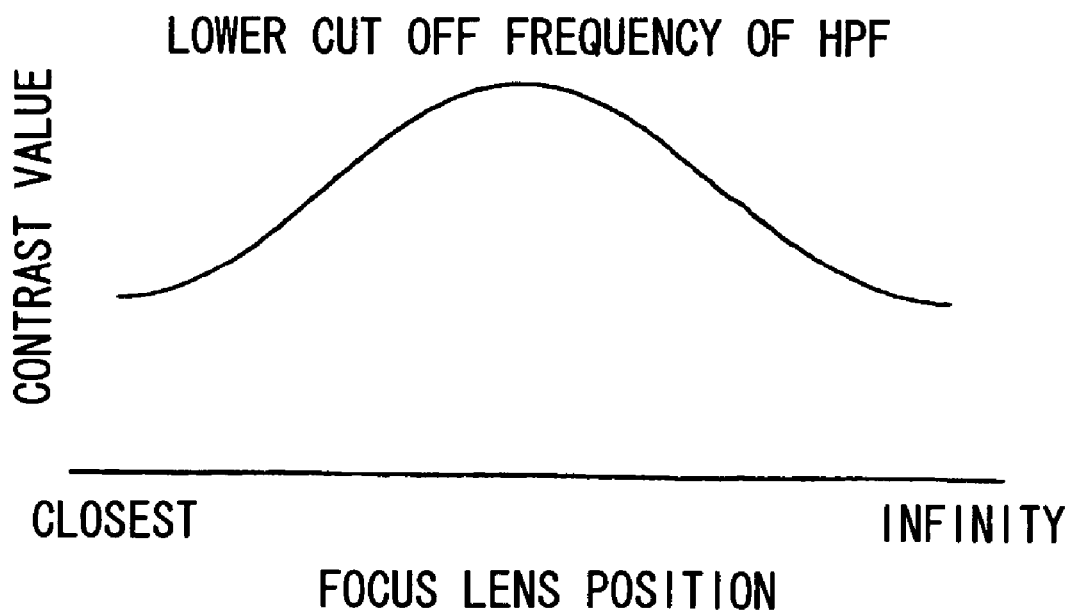
FIG. 5B is a diagram showing a general effect on a contrast value curve when a cut off frequency is decreased in an HPF.

Now, a general effect which is obtained by a change of a cut off frequency $f_{CL}$ of the HPF 22 is shown in FIGS. 5A and 5B. FIGS. 5A and 5B are graphs having a horizontal axis for the positions of the focusing lens FL and a vertical axis for the contrast values, and show the changes of the contrast values while the focusing lens FL is moved relative to a certain object from the closest end to the infinity end, for both of the cases in which the cut off frequency $f_{CL}$ of the HPF 22 is higher and lower respectively. As seen from the FIGS. 5A and 5B, generally, the higher the cut off frequency $f_{CL}$ of the HPF 22 is, the steeper the unimodal distribution of the contrast value curve is, and the lower the cut off frequency $f_{CL}$ of the HPF 22 is, the more gentle the unimodal distribution of the contrast value curve is.

To the contrary, in the case of a photographing lens of a front focus type (the photographing lens of the present embodiment is of the front focus type), generally, a longer focal length and a smaller aperture value make the unimodal distribution of a contrast value curve steeper. When the unimodal distribution of a contrast value curve is extremely steep, hunting may occur around the peak of the contrast value if the AF speed is set to be sufficiently low because the focusing lens FL does not stop at the peak, but the too much low AF speed requires a longer time for focusing.

Thus, if the unimodal distribution of a contrast value curve can be appropriately steep with a longer focal length and a smaller aperture value which cause the cut off frequency $f_{CL}$ of the HPF 22 to be automatically lowered, such a configuration is effective because hunting can be prevented due too an AF speed which is not too much low, and a troublesome operation by a user can be eliminated. In the filter automatically setting mode, a focal length of the photographing lens and an aperture value are taken in consideration as described above, and the cut off frequencies (standard values) of the HPF 22 and the LPF 24 are set so that generally the unimodal distribution of a contrast value curve appropriately steeply slopes.

However, the steepness of a unimodal distribution of a contrast value curve and the effect obtained by changing the cut off frequencies of the HPF 22 and the LPF 24 vary depending not only on a setting of the photographing lens such as focal length or an aperture value but also on conditions of an object, thereby if the cut off frequencies of the HPF 22 and the LPF 24 are automatically set only in the light of the setting of the photographing lens, hunting may occur or an AF accuracy may be considerably degraded depending on conditions of an object.

Therefore, the filter manually setting mode is extremely useful in which a user can manually control the cut off frequencies of the HPF 22 and the LPF 24 to comply with a setting of the photographing lens, conditions of an object, and the like in individual photographing so that hunting is prevented without fail and a considerable degradation of an AF accuracy is prevented.

The cut off frequencies of the HPF 22 and the LPF 24 in the filter automatically setting mode may be constant in spite of any setting of the photographing lens. Although filter features other than the cut off frequency can be intentionally changed by changing filter coefficiencies of the HPF 22 and the LPF 24, in the present embodiment, a change of a filter coefficiency is the main object, and other filter features will not be referred to.

Next, a setting of an AF speed which is a movement speed of a focus lens FL in AF control will be explained. In FIG. 3, an A/M switch 56 is a switch for selecting between an AF speed automatically setting mode for automatically setting an AF speed, and an AF speed manually setting mode for manually setting an AF speed. In an off state, the AF speed automatically setting mode is selected and a built-in lamp is turned off, and in an on state, the AF speed manually setting mode is selected and the built-in lamp is turned on.

The CPU 10 communicates with the AF operating section 34 to obtain the on/off state of the A/M switch 56 so that the CPU 10 detects a selection of the AF speed automatically setting mode or the AF speed manually setting mode. When the AF speed automatically setting mode is selected, the CPU 10 automatically sets an AF speed. In the automatic setting of an AF speed, a focal length and an aperture value are taken in consideration, and in AF control, the CPU 10 detects the position of the zoom lens ZL and the position of the aperture I by using the position sensor ZP and the position sensor IP shown in FIG. 1, and sets an AF speed to be a normal value (standard value) based on the positions.

Figure 6A:
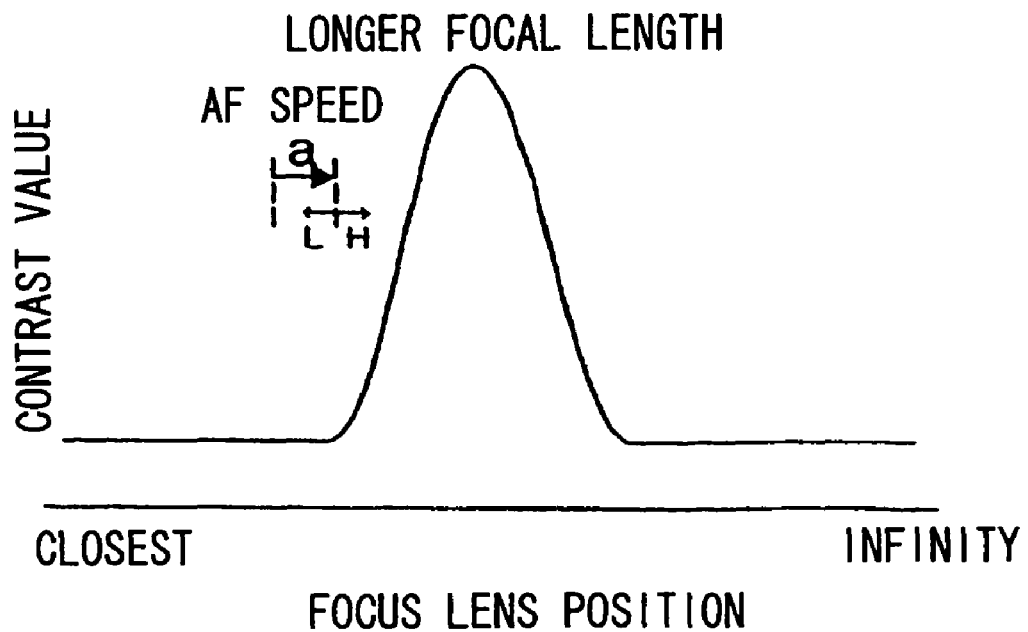
FIG. 6A is an explanation diagram which is used to explain a setting of an AF speed.
Figure 6B:
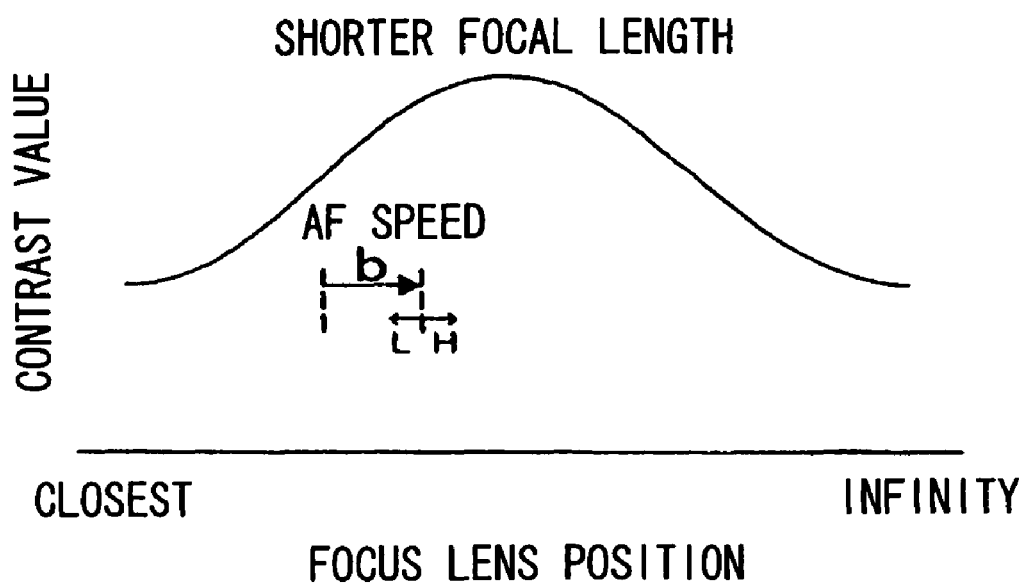
FIG. 6B is an explanation diagram which is used to explain a setting of an AF speed.

FIGS. 6A and 6B show general unimodal distributions of contrast value curves for both of the cases in which a focal length is longer and shorter respectively, and the longer the focal length is, the steeper the unimodal distribution of the contrast value curve is, and the shorter the focal length is, the more gentle the unimodal distribution of the contrast value curve is. According to the above results, since a longer focal length (and a smaller aperture value) tends to cause hunting, the AF speed in the AF speed automatically setting mode is set to be lower for a longer focal length (and a smaller aperture value), and is set to be higher for a shorter focal length (and a larger aperture value) as shown by an arrow a of FIG. 6A and an arrow b of FIG. 6B.

To the contrary, when the AF speed manually setting mode is selected by the A/M switch 56 of the AF operating section 34, the CPU 10 sets an AF speed to be the values specified by the manual operation. In FIG. 3, a dial 58 is a rotation operating member to specify the AF speed in the AF speed manually setting mode, and when the AF speed manually setting mode is selected, the rotated position of the dials 58 is detected by a potentiometer and transferred to the CPU 10.

The CPU 10 sets the value which corresponds to the rotated position of the dial 56 to be a manually set value, and in the AF speed automatically setting mode, the CPU 10 sets the value which is obtained by adding the manually set value to the AF speed (standard value) determined by the positions of the zoom lens ZL and the aperture I to be the AF speed in the AF speed manually setting mode.

The above configuration allows an AF speed to be changed as follows. The manually set value is 0 when the dial 56 is at the middle position of its rotation range, and an AF speed at the point of time is set to be the standard value which is automatically set in the AF speed automatically setting mode. The standard value depends on, as shown by the arrow a of FIG. 6A and the arrow b of FIG. 6B, a focal length and an aperture value in AF control. A clockwise rotation of the dial 56 from the middle position causes the manually set value to be increased in the positive direction from the value 0 (in the H direction of FIGS. 6A and 6B), and the increased value is added to the standard value, which causes the AP speed to be increased. A counterclockwise rotation of the dial 56 from the middle position causes the manually set value to be increased in the negative direction from the value 0 (in the L direction of FIGS. 6A and 6B), and the value is added to the standard value, which causes the AP speed to be decreased.

In comparison of the AF speed automatically setting mode and the AF speed manually setting mode, the AF speed automatically setting mode is effective because hunting can be prevented under conditions of a normal object and also a troublesome operation by a user can be eliminated. However, the steepness of a unimodal distribution of a contrast value curve is not determined only by a setting of the photographing lens as described above, and varies depending on conditions of an object, thereby hunting may occur or an AF speed may be unnecessarily lowered. To the contrary, the AF speed manually setting mode in which an AF speed can be set to comply with a setting of the photographing lens and conditions of an object in individual photographing is extremely effective because hunting can be prevented without fail and an unnecessarily lowered AF speed can be prevented. The use of both of the filter manually setting mode and the AF speed manually setting mode allow an AF accuracy and an AF speed to be achieved which are complied with an purpose of use of AF under the restriction no hunting is generated.

For example, in the case when almost no change of focus is required in an actual photographing, because an initial focus can be prepared before the actual photographing, a slow AF speed does not cause any problem. Thus, in this case, an AF accuracy has a priority over an AF speed. In other case, a focus with a high accuracy is required. In the latter case, an AF for a focus with a high accuracy purpose is desired. Then, the cut off frequencies of the HPF 22 and the LPF 24 are manually controlled to obtain a steepest unimodal distribution of a contrast value curve, and also to lower an AF speed to the level without hunting, which achieves an AF which is appropriate to the purpose.

In the case for sports broadcast for example in which focus is instantly changed or frequently changed, an AF speed has a priority over an AF accuracy. In this case, an AF speed is manually controlled to be a value which satisfies a demand, and at the AF speed, the cut off frequencies of the HPF 22 and the LPF 24 are controlled not to cause deficiency such as hunting, which achieves an AF which is appropriate to the purpose. The above description is intended to illustrate one example of a method for setting an AF speed and the cut off frequencies of the HPF 22 and the LPF 24, and the method is not limited to the above description.

Furthermore, the AF operating section 34 may include a memo pad function for storing rotated positions of the dials 52, 54, and 58 and outputting the stored rotated positions to the CPU 10 of the lens unit, and in corresponding to this case, a memo pad switch 60 and selection switches 62 from 1 to 4 are provided to the AF operating section shown in FIG. 3. When the memo pad switch 60 is turned on and the built-in lamp is lighted, a pressing of a desired selection switch 62 causes a data of a rotated positions of the current set dials 52, 54, and 58 to be stored in and maintained at a built-in memory. At this point of time, if one of an AF speed and a cut off frequency is in the automatically setting mode, the one in the automatically setting mode may store the data of a rotated positions of the dials, but instead of the data of a rotated positions of the dials, may store a data showing that an AF speed or a cut off frequency is in the automatically setting mode (showing that the A/M switch 50 or the A/M switch 56 is turned off (automatically set)).

To the contrary, when the memo pad switch 60 is turned off and the built-in lamp is distinguished, a pressing of the selection switch 62 which was used to store the data causes the stored data of the rotated positions of the current set dials 52, 54, and 58 (of the data showing that the A/M switch 50 or the A/M switch 56 is turned off) to be converted to the actual rotated positions of the current set dials 52, 54, and 58, which is output to the CPU 10 of the lens unit. This facilitates a recall of the setting of an AF speed or a cut off frequency at the point of time when the data of the rotated positions of the current set dials 52, 54, and 58 is stored. Several types of combinations of an AF speed and cut off frequencies of the HPF 22 and the LPF 24 may be stored so that each type can be read out by using a name such as a high speed AF mode or an obscure object mode. The data which is stored in associated with each selection switch 62 may be stored in an EEPROM 16 (see FIG. 1) which can be directly referred to by the CPU 10, instead of the AF operating section 34, so that the CPU 10 stores or reads out data of an AF speed and the like in accordance with an operation on the memo pad switch 60 or the selection switches 62 which is obtained from the AF operating section 34.

Next, a series of setting processings of an AF speed and the HPF 22 and the LPF 24 in the CPU 10 will be explained below with reference to the flowchart of FIG. 7. First, after a required initial setting (step S10), the CPU 10 executes processing except AF control (step S12), and then determines if an AF mode is selected or not based on the on/off of the AF switch S1 (step S14). The AF of the present embodiment is one shot AF, but in the case of so-called continuous AF in which AF control is repeatedly performed after a focus is obtained unless a user intentionally switches the current mode to the MF mode and an AF speed and a cut off frequency are manually set, for example, once the AF switch S1 is turned on, the AF mode is not switched to the MF mode until the AF switch S1 is turned on again, and during the continuous AF mode, the processings of AF mode which are similar to those of one shot AF may be repeatedly executed which will be explained below.

When the CPU 10 determines NO at the above step S14, the CPU 10 goes back to the processing at step S12. To the contrary, when the CPU 10 determines YES at the above step S14, the CPU 10 goes to the processing of AF mode, and first reads in the position of the aperture I (aperture position) IP and the position of the zoom lens ZL (zoom position) ZP (steps S16 and S18).

Next, the CPU 10 reads in the setting at the AF operating section 34 (step S20), and determines if the filter manually setting mode is selected or not (step S22).

When the CPU 10 determines NO, that is, the filter automatically setting mode is selected, the CPU 10 calculates the filter coefficiencies for each of the HPF 22 and the LPF 24 which correspond to the aperture position IP and the zoom position ZP, and sets the values onto the HPF 22 and the LPF 24 (step S24). To the contrary, when the CPU 10 determines YES, that is, the filter manually setting mode is selected, the CPU 10 reads in the manually set values of the cut off frequencies of the HPF 22 and the LPF 24 which are specified by the rotated position of the dials 52 and 54 of the AF operation section 34, and sets the corresponding filter coefficiencies onto the HPF 22 and the LPF 24 (step S26).

After the processing at step S24 or step S26, next, the CPU 10 calculates the standard value FS of AF speed which correspond to the aperture position IP and the zoom position ZP (step S28). Then, the CPU 10 determines if the AF speed manually setting mode is selected or not based on the setting of the AF operating section 34 (step S30).

When the CPU 10 determines NO, that is, the AF speed automatically setting mode is selected, the CPU 10 sets the standard value FS of AF speed calculated at step S28 as the AF speed, and while reading in the contrast value from the contrast value detecting section 18, causes the focusing lens FL to move at the AF speed, and executes the above AF control to obtain the peak contrast value (step S34).

To the contrary, when the CPU 10 determines YES at step S30, that is, the AF speed manually setting mode is selected, the CPU 10 reads in the manually set value which corresponds to the rotated position of the dial 58 of the AF operating section 34, and adds the manually set value to the standard value FS of the AF speed calculated at step S28 to set the resulting value as the AF speed (step S32). Then, while reading in the contrast value from the contrast value detecting section 18, the CPU 10 causes the focusing lens FL to move at the AF speed which is set at step S32, and executes the above AF control to obtain the peak contrast value (step S34).

Once the CPU 10 completed the above described processings, the CPU 10 starts the processing at step 12.

While in the above embodiment, the AF operating section 34 allows a cut off frequency of a filter or an AF speed to be manually set, but in the case of an auto focus system equipped with an image pickup device only for AF, another function may be added so that luminance of a video signal obtained from the image pickup device can be manually controlled, or addition and subtraction of the luminance can be manually controlled.

In addition, the connection of the AF operating section 34 is not limited to the use of a cable, and the AF operating section 34 may be integrally arranged with the lens unit of the focus operating section.

Figure 8:
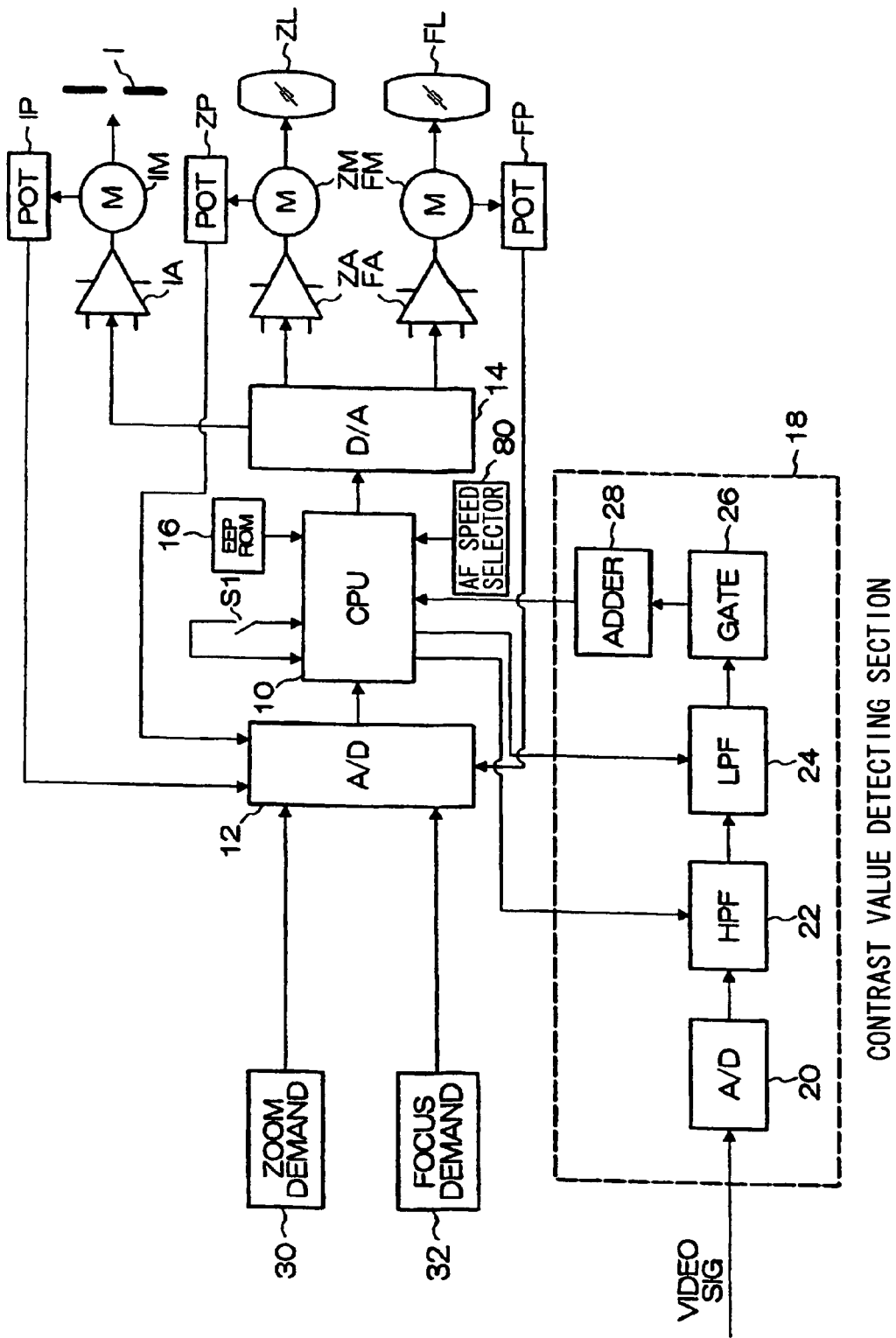
FIG. 8 is a block diagram showing a structure of a lens system to which another embodiment of an auto focus system is applied.

Next, an auto focus system will be explained below which shows another embodiment with respect to a setting of AF speed in AF control. FIG. 8 is a block view showing a structure of a lens system to which an auto focus system of the present embodiment is applied. In FIG. 8, the same or similar blocks as those of the lens system shown in FIG. 1 are designated by the same reference numerals, and will not be explained below.

In the lens system of FIG. 8, the lens unit is not connected to the AF operating section 34 of FIG. 1, but is provided with an AF speed selector 80.

Figure 9:
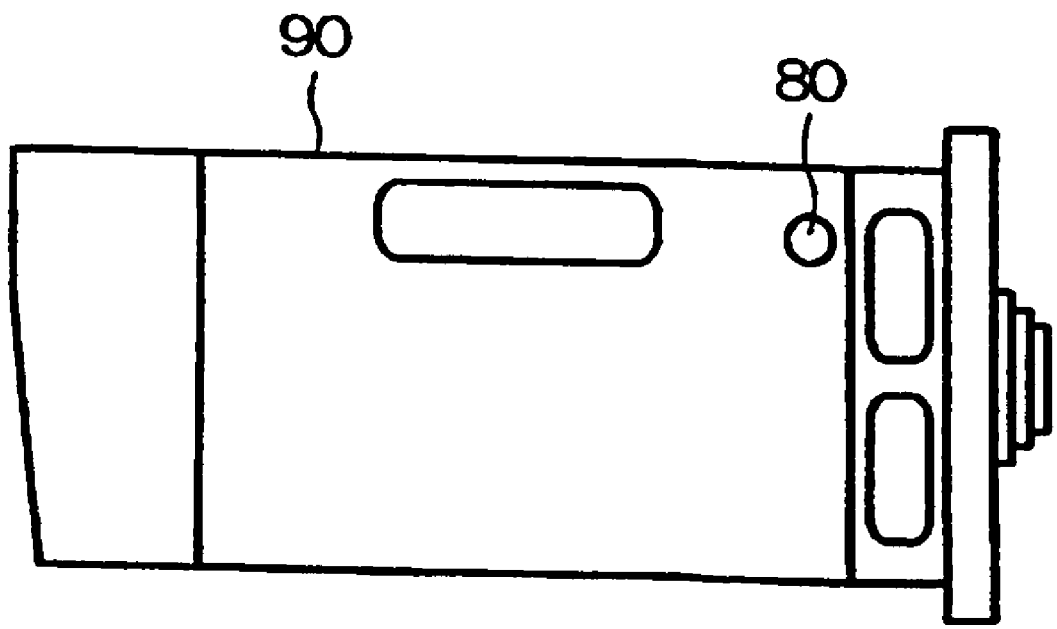
FIG. 9 is an outside view showing an arrangement of an AF speed selector of an EFP lens.
Figure 10:
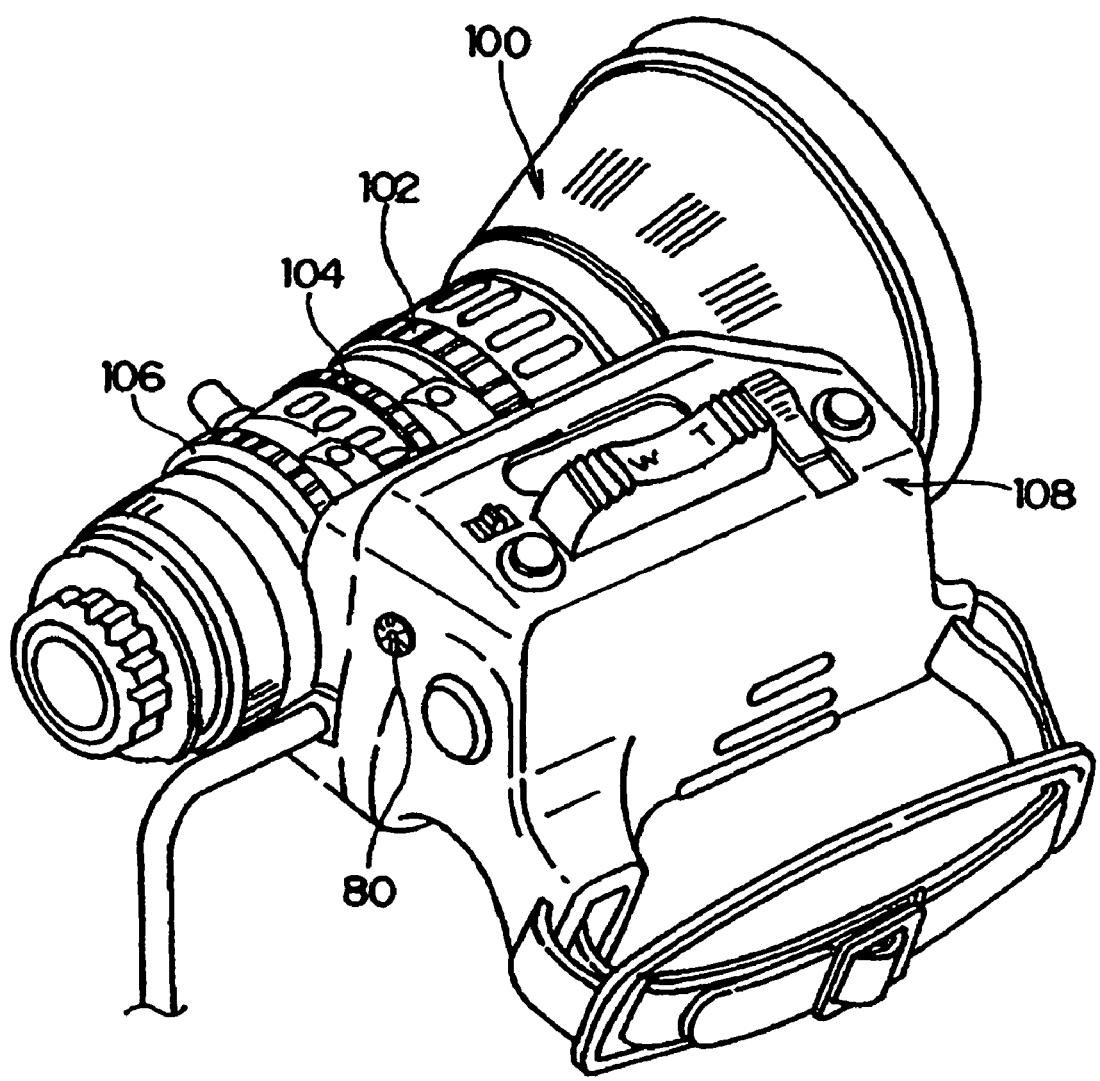
FIG. 10 is an outside view showing an arrangement of an AF speed selector of an ENG lens.

In the case where the lens unit of FIG. 8 is an EEP lens which is generally used in studio as shown in FIG. 9, the EEP lens is covered with a box-shaped cover 90, and the AF speed selector 80 is, for example, rotatably mounted to a side surface of the cover 90. In the case where the lens unit is an ENG lens which is generally potable to be used for news gathering and the like as shown in FIG. 10, a lens barrel 100 of a photographing lens is provided with rotatable operation rings 102, 104, and 106 for operating the positions of a focusing lens FL, zoom lens ZL, and an aperture I respectively, and also is provided with a driving unit 108 at a side surface of the lens barrel 100 for motor driving the operation rings 102 to 106. The AF speed selector 80 is, for example, rotatably mounted to the rear surface of the driving unit 108.

In FIG. 8, the CPU 10 performs a filter automatically setting processing and an AF speed automatically setting processing in AF control which are explained in the above embodiment, and the cut off frequency $f_{CL}$ and $f_{CH}$ of the HPF 22 and the LPF 24 and an AF speed are automatically set based on a focal length (the position of the zoom lens ZL) of a photographing lens and an aperture value (the position of the aperture I).

In the automatically setting of an AF speed, an AF speed is set to be a normal value (standard value) corresponding to the focal length and the aperture value, and set to be different depending on the focal length and the aperture value, but the standard value corresponding to the focal length and the aperture value can be larger or smaller in total by using the AF speed selector 80.

Figure 11:
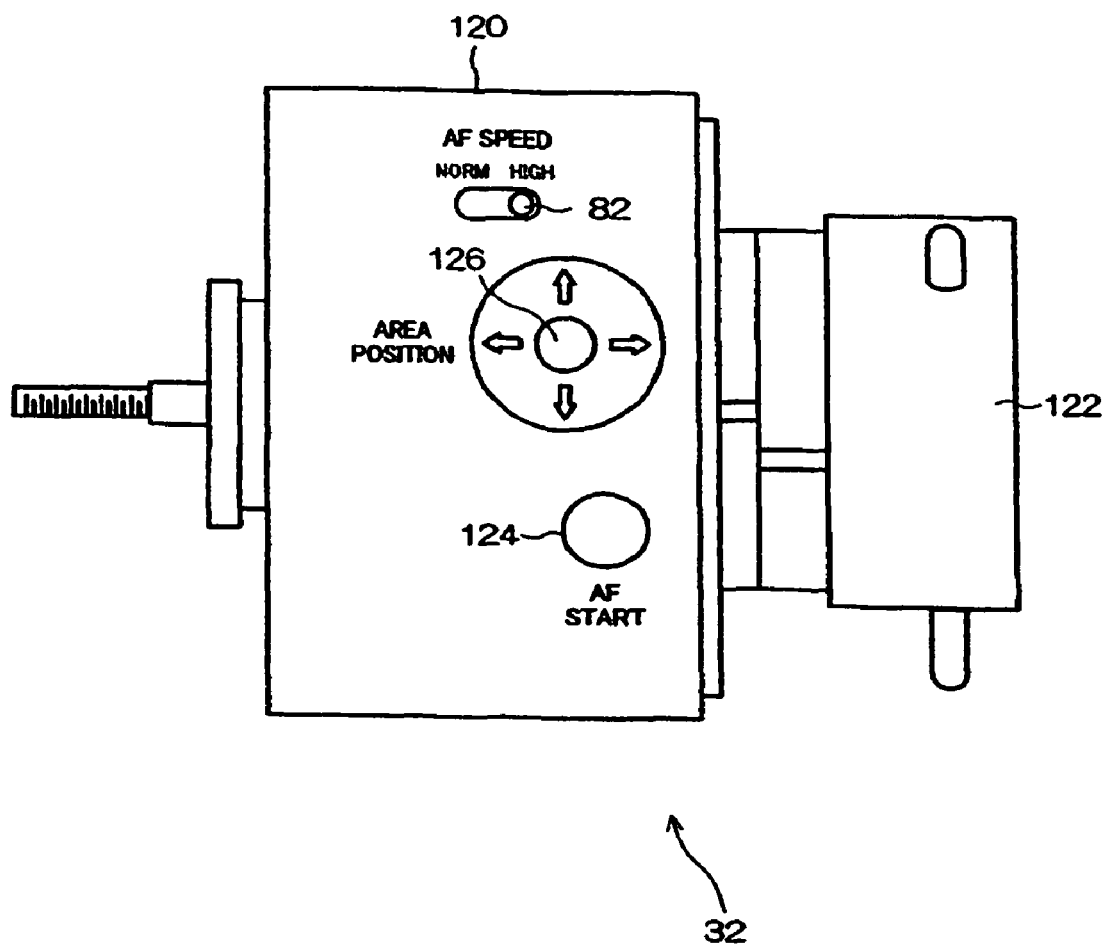
FIG. 11 is an outside view showing an outside of a focus on demand image processing component on which an AF speed control switch is mounted.

The focus on demand image processing component 32 is provided with an AF speed control switch. The focus on demand image processing component 32 is configured as shown in FIG. 11 for example, and includes a cylindrical body 120 in which various circuits are built, and a focus knob 122 which is rotatably attached to the body 120 for manually operating the focusing lens FL in MF control. The body 120 has a peripheral surface to which an AF speed control switch 82, an AF switch 124 (AF switch S1 of FIG. 8), and a joy stick 126 are provided. The AF switch S1 is, as explained in the above embodiment, a switch for switching MF mode to AF mode to execute an AF control, and the joy stick 126 is an operating member for moving a position of an AF area, which is the AF target range, within a range for photographing.

The AF speed control switch 82 is a slide type of switch between two positions for a standard mode and a high speed mode, and when set at the position on the left side for the standard mode in FIG. 8, an AF speed is set to have the standard value which is set by the above AF speed selector 80. To the contrary, when the AF speed control switch 82 is set at the position on the right side for the high speed mode in FIG. 8, an AF speed is switched to have the value which is obtained by multiplying the standard value in the above standard mode by a predetermined value. For example, the predetermined value is preferably 2 to 4. In this way, the AF speed can be instantly increased when a user wants an AF speed higher than the standard speed.

Figure 12:
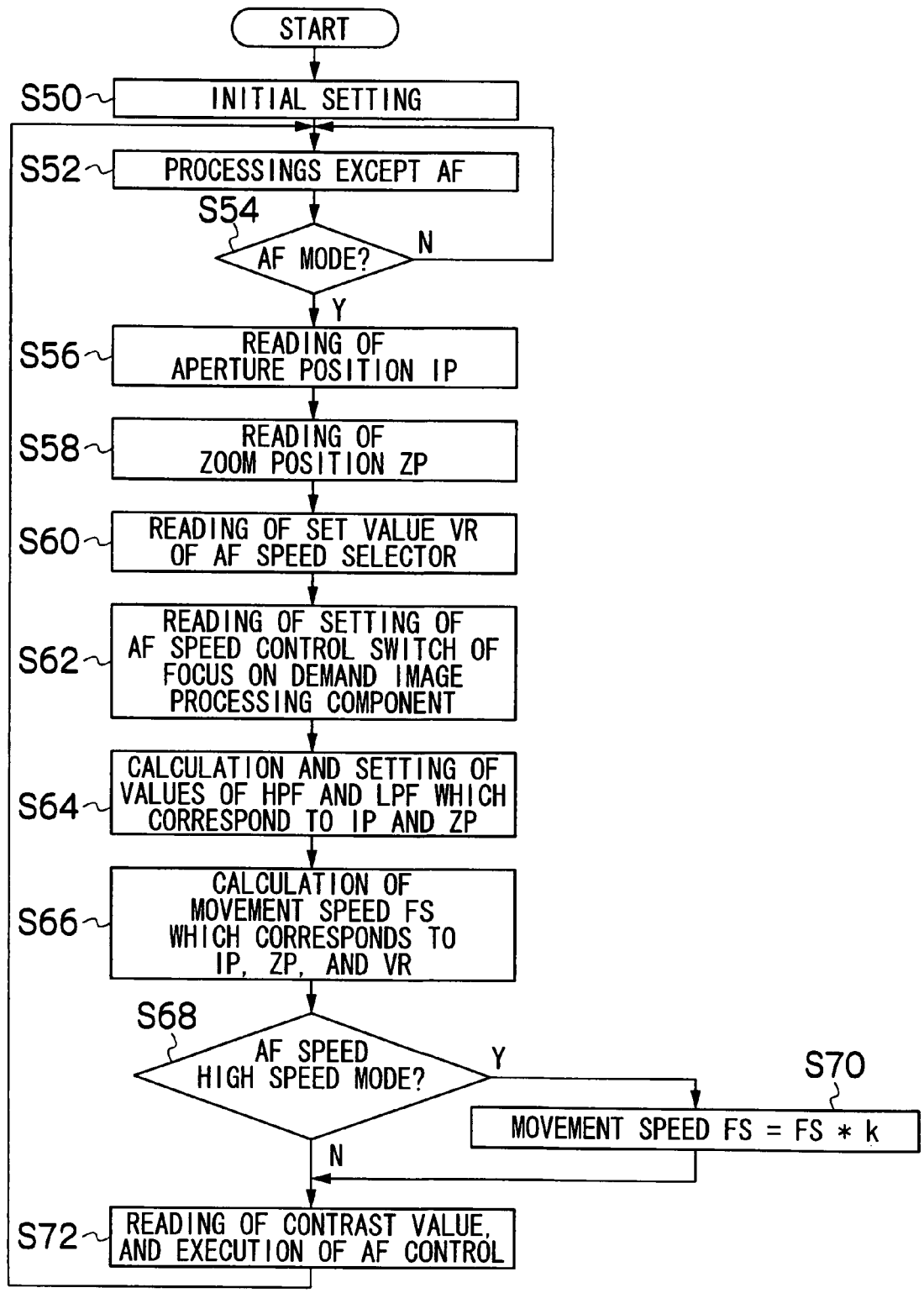
FIG. 12 is a flowchart showing processings for setting an AF speed of another embodiment.

FIG. 12 is a flowchart showing processings for setting an AF speed in the CPU 10 of the present embodiment. First, after a required initial setting (step S50), the CPU 10 executes processing except AF control (step S52), and then determines if an AF mode is selected or not based on the on/off of the AF switch 124 (S1) of the focus demand 32 (step S54). When determined NO, the CPU 10 goes back to the processing at step S52. When determined YES, the CPU 10 goes to the processing of AF mode, and first reads in the position of the aperture I (aperture position) IP and the position of the zoom lens ZL (the zoom position) ZP (steps S56 and S58). Then, the CPU 10 reads in the set value VR of the AF speed selector 80 (step S60). The CPU 10 also reads in the setting of the AF speed control switch 82 on the focus on demand image processing component 32 (step S62).

Next, the CPU 10 calculates the filter coefficiencies for each of the HPF 22 and the LPF 24 which correspond to the aperture position IP and the zoom position ZP (step S64). Subsequently the CPU 10 calculates the standard value of AF speed which correspond to the aperture position IP and the zoom position ZP and the set value VR of the AF speed selector 80, and sets the resulting value as the set value (movement speed) FS of AF speed (step S66). Then the CPU 10 determines if the mode set by the AF speed control switch 82 is the high speed mode or not (step S68).

When the CPU 10 determines NO, that is, the standard mode is selected, while reading in the contrast value from the contrast value detecting section 18, the CPU 10 causes the focusing lens FL to move at the AF speed of the set value FS which is set at step S66, and executes the above AF control to obtain the peak contrast value (step S72).

When the CPU 10 determines YES, that is, the high speed mode is selected at step S68, the CPU 10 changes the set value FS of AF speed to the value which is obtained by multiplying set value FS of AF speed which is set at step S66 by a factor k (step S70). That is, the CPU 10 changes the set value of AF speed to the value FS=FS×k. The factor k from 2 to 4 is reasonable. While reading in the contrast value from the contrast value detecting section 18, the CPU 10 causes the focusing lens FL to move at the AF speed of the set value FS which is set at step S70, and executes the above AF control to obtain the peak contrast value (step S72). When the CPU 10 completes the above processings, the CPU 10 starts the processing at step S52.

In the above embodiment explained by reference to FIG. 8 to FIG. 12, the AF speed selector 80 may be mounted to a desired position of a desired unit (for example, the focus on demand image processing component 32) instead of the lens unit, and the AF speed control switch 82 also may be mounted to a desired position of a desired unit (for example, the lens unit), instead of the focus on demand image processing component 32. Although AF speed in the high speed mode is described to be preferably two to four times that of the AF speed in the standard mode, other factor (a factor less than 1 is possible) may be used to change the speed, and also a function to set and change a desired factor may be provided. Furthermore, a selector for setting a speed in the standard mode and a selector for setting a speed in the high speed mode may be separately provided. The AF speed control switch 82 may be used not only to select between the two modes of standard mode and high speed mode, but also select between more than two modes by providing options to multiply the speed both in the standard mode and the standard mode.

Even when the AF speed automatically setting mode or the AF speed manually setting mode can be selected as in the embodiment explained by reference to FIG. 1 to FIG. 7, the technique in the embodiment explained by reference to FIG. 8 to FIG. 12 may be applied such a case, and the standard value of AF speed in the embodiment explained by reference to FIG. 1 to FIG. 7 may be changed by the set value of the AF speed selector 80. In either of the AF speed automatically setting mode or the AF speed manually setting mode, or in a certain mode, the AF speed may be obtained by multiplying the AF speed in the standard mode by a predetermined factor when the standard mode is switched to the high speed mode by using the AF speed control switch 82.

In the embodiment explained by reference to FIG. 8 to FIG. 12, the case in which an AF speed is changed depending on a focal length or an aperture value is explained, but even in the case in which an AF speed is not changed depending on a focal length or an aperture value is explained, it is possible to make an AF speed changed between the standard mode and the high speed mode, and to make the standard speed in the standard mode changed between the standard mode and the high speed mode.

The invention claimed is:

1. An auto focus system for moving a focusing lens of a photographing lens based on a contrast of an image of an object which is focused by the photographing lens, comprising:

auto focus controlling means for automatically setting the focusing lens to a focus position; and speed indicating means for inputting an indication of a movement speed of the focusing lens, so that the auto focus controlling means causes the focusing lens to move at the movement speed indicated by the speed indicating means, wherein said auto focus controlling means provides an automatically setting mode for automatically setting a movement speed of the focusing lens in response to the setting of the photographing lens which at least includes a focal length or an aperture value; and a manually setting mode for setting a movement speed of the focusing lens to the movement speed indicated by the speed indicating means, wherein the speed indicating means inputs an indication of an amount of change with respect to the movement speed of the focusing lens which is set by the automatically setting mode, and in the manually setting mode, the auto focus controlling means sets the value obtained by adding the amount of change to the movement speed which is set by the automatically setting mode as a movement speed of the focusing lens.

2. The auto focusing system according to claim 1, further comprising:

a contrast value calculating means for calculating a contrast value which represents a contrast of the image of an object by using a video signal of the image of an object focused by the photographing lens, the contrast value calculating means having filter means for extracting a signal within a predetermined frequency band from the video signal; and frequency indicating means having an automatic and a manual control for inputting an indication of a cut off frequency of the filter means for blocking a signal having a higher or lower frequency component of the video signal, wherein the user using the manual control can change the frequency band by adjusting the cut off frequency wherein the filter means is changed to have a characteristic with a cut off frequency which is indicated by the frequency indicating means.

3. The auto focusing system according to claim 1, wherein the speed indicating means is the means for indicating to change the movement speed of the focusing lens to a movement speed which is obtained by multiplying a standard movement speed by a predetermined factor.

4. The auto focusing system according to claim 3, further comprising:

changing means for changing the standard movement speed of the focusing lens.

5. The auto focusing system according to claim 4, wherein the speed indicating means is a switch mounted to a focus operation apparatus for performing an operation with respect to the focusing lens.

6. The auto focusing system according to claim 3, wherein the speed indicating means is a switch mounted to a focus operation apparatus for performing an operation with respect to the focusing lens.

* * * * *